United States Patent Office 3,520,366
Patented July 14, 1970

3,520,366
IMPARTING IN SITU STABILITY TO DISPLACING FLUIDS
Stanley C. Jones, Littleton, Colo., assignor to Marathon Oil Company, Findlay, Ohio, a corporation of Ohio
No Drawing. Filed Dec. 26, 1967, Ser. No. 693,103
Int. Cl. E21b 43/22
U.S. Cl. 166—273   13 Claims

ABSTRACT OF THE DISCLOSURE

A secondary-type recovery process wherein crude oil is recovered from a subterranean formation by moving therethrough a displacing fluid containing electrolyte and/or semi-polar compound is improved by injecting into the formation before the displacing fluid a liquid pre-slug containing semi-polar compound or electrolyte and semi-polar compound. Examples of displacing fluids include water- and oil-external emulsions, and water- and oil-external micellar dispersions and miscible-type fluids; examples of liquid pre-slugs include preferably aqueous fluids but also include those which are substantially hydrocarbon. A mobility buffer slug can follow the displacing fluid, examples include those which are substantially hydrocarbon as well as aqueous slugs. The displacing fluid and the mobility buffer can be displaced through the formation by a drive material which can be substantially hydrocarbon or aqueous.

BACKGROUND OF THE INVENTION

United States Pat. No. 3,275,075 to Gogarty et al., teaches the use of semi-polar compounds, such as alcohols, amines, and ketones in microemulsions. Such microemulsions are useful in secondary-type oil recovery. United States Pat. No. 3,324,944 to Poettmann teaches a "pre-slug" injection of a non-polar organic liquid into the formation to improve the stability of flooding processes using a microemulsion.

Secondary-type recovery processes (including tertiary recovery) utilizing displacing fluids containing an electrolyte and/or a semi-polar compound sometimes experience a "leaching" or sorption of the electrolyte and/or semi-polar compound. It is postulated that the affinity of the interstitial water for these components tends toward equilibrium conditions at the juncture of the displacing fluid and interstital water. As a result, the characterstics of displacing fluids change.

Applicants have discovered that by injecting a liquid pre-slug containing semi-polar compound or electrolyte and a semi-polar compound into the subterranean formation before injection of the displacing fluid, characteristics of the fluid can be better stabilized to improve oil recovery.

DESCRIPTION OF THE INVENTION

This invention is applicable to a secondary-type recovery process (including tertiary recovery) wherein a subterranean formation is flooded with a displacing fluid containing a semi-polar compound and/or an electrolyte. The displacing fluid can be any fluid which will effectively displace crude petroleum from the subterranean formation. Examples of such fluids include miscible-type fluids such as alcohols, water- and oil- external emulsions, and water- and oil- external micellar dispersions. The term micellar dispersion is meant to include micellar solutions. The displacing fluid preferably contains hydrocarbon.

Preferably, the displacing fluid is a micellar dispersion. The term "micellar dispersion" as used herein, is meant to include "micro-emulsions" [Schulman and Montagne, Annals of the New York Academy of Sciences, 92, pages 366–371 (1961)], oleopathic hydro-micelles [Hoar and Schulman, Nature, 152, page 102 (1943)], "transparent" emulsions (Blair, Jr. et al., United States Pat. No. 2,356,205) and micellar solutions defined in United States Pat. Nos. 3,254,714; 3,275,075; 3,301,325; 3,307,628; and 3,330,344. The micellar dispersions differ from the emulsion in that the former are thermodynamically stable whereas the latter are not. Examples of micellar dispersions include those taught in United States Pat. No. 3,348,611 to Reisberg.

The micellar dispersions are composed essentially of a hydrocarbon, an aqueous medium, and a surfactant. Examples of hydrocarbon include crude oil, crude column overheads, straight-run gasoline and liquefied petroleum gases. Useful surfactants include cationic, nonionic and anionic surface active compounds. A particularly useful surfactant is an alkyl aryl sulfonate containing a monovalent cation (e.g. potassium, sodium, and ammonium), more commonly known as petroleum sulfonates or as alkyl aryl naphthenic sulfonates. Examples of useful surfactants are disclosed in U.S. 3,275,075.

Semi-polar compounds, also known as co-surfactants and co-solubilizers, useful with the displacing fluids, especially the micellar dispersions, include alcohols, amines, esters, aldehydes, and ketones containing one up to about 20 or more carbon atoms. Preferably, the semi-polar compound is an alcohol, e.g. ethanol, isopropoanol, n- and isobutanol, the amyl alcohols, 1- and 2-hexanol, 1- and 2-octanol, the decyl alcohols, alkyl aryl alcohols such as p-nonyl phenol and alcoholic liquors such as fusel oil.

Electrolytes useful with the displacing fluids (especially the micellar dispersions) include inorganic bases, inorganic acid, inorganic salts, organic bases, organic acids, and organic salts. Preferably, the electrolytes are inorganic bases, inorganic acids and inorganic salts, e.g., sodium hydroxide, sodium chloride, sodium sulfate, hydrochloric acid, sulfuric acid, and sodium nitrate. Other useful electrolytes can be found in U.S. 3,330,343. Also, the salts contained in brackish or brine water are to be included as electrolytes.

Some subterranean formations contain interstitial water, including water from waterflooding, which tends to "leach" or "sorb" the semi-polar compound and/or electrolyte from the displacing fluid, especially micellar dispersions and solutions. As a result, the operational characteristics of the displacing fluid in the formation are adversely affected.

The use of a pre-slug containing semi-polar compound or semi-polar compound and electrolyte, inhibits the tendency of the formation to degrade the displacing fluid and other injected fluids, e.g. a mobility buffer. Preferably, the pre-slug is aqueous, but can be non-aqueous, and contains at least at the juncture with the displacing fluid, enough semi-polar compound or semi-polar compound and electrolyte to establish equilibrium with similar components within the front portion of the displacing fluid. The semi-polar compound and electrolyte used in the pre-slug can be identical with those in the displacing fluid. Other components can be incorporated into the pre-slug to impart desired characteristics, e.g. corrosion inhibitors, bactericides, agents to inactivate surfactant sorption sites on the rock surface, etc. Examples of amounts useful in the pre-slug include from about 0.1% to about 5 volume percent of the semi-polar compound and from about 0.01% to about 5 weight percent of the electrolyte. The pre-slug of this invention is not defined as a water-containing soluble oil.

The electrolytes can reduce the swelling tendency of the clays within the reservoir sands. Thus, permeability of the sands can be maintained at a more desired value.

After the pre-slug and displacing fluid are injected into the substerraneon formation, there is injected a mobility buffer such as LPG (liquefied petroleum gas), water-external emulsion or a polar material such as water. The mobility buffer should have a mobility to protect the displacing fluid from invasion by a subsequent water drive. The mobility buffer preferably has a mobility equal to about that or less than that of the displacing fluid. More preferably, a portion (i.e. from 5% to 100%) of the mobility buffer can have mobilities graded from a low of about that of the displacing fluid to a high of about that of the water drive. Thereafter, sufficient amounts of a drive material, e.g. water, are injected into the formation to displace the pre-slug, displacing fluid and mobility buffer toward a production well.

The mobility buffer is preferably water containing a mobility reducing agent. Useful examples of mobility buffers (also known as thickened drive materials) are found in United States Pat. No. 3,261,399 to Coppel. Any agent which will effectively reduce the mobility (e.g. increases the apparent viscosity) of the mobility buffer and which is compatible with the mobility buffer and the displacing fluid is useful with this inventon.

Generally, the amount of pre-slug injected into the formation will depend upon the particular characteristics of the formation, and on the composition and amount of the displacing fluid. The volume of the pre-slug is preferably about equal to the volume of the displacing fluid injected into the formation. Generally, the amount of the pre-slug need be only about 1% to about 30% and preferably from about 2% to about 10% formation pore volume. The amount of the displacing fluid can range from about 1% up to about 30% and preferably from about 2% up to about 10% formation pore volume when micellar dispersions are used.

The following examples are presented to specifically illustrate working embodiments of the inveintion. The examples are not intended to limit in any way the invention. The operational procedure, components within the pre-slugs, components within the micellar dispersions, etc. can be varied. It is intended that all equivalents obvious to those skilled in the art be included within the scope of this invention. Percents are based on volume unless otherwise specified.

EXAMPLE 1

Berea sandstone cores 4 feet long by 2 inches in diameter having characteristics indicated in Table I are saturated with distilled water containing 16,500 p.p.m. of NaCl and are then flooded to irreducible water saturation with crude oil taken from the Wilkin lease in Ill. (a sweet, black crude oil having a 9.0 cp. viscosity at 72° F. and a specific gravity of 0.846). Core samples B and C are flooded with 10% pore volume of a pre-slug composed of 18,000 p.p.m. of NaCl dissolved in distilled water and containing amounts of isopropanol indicated in Table I.

Core sample A is not treated with a pre-slug. The cores are flooded with 10% formation pore volume of a micellar dispersion consisting of 62.7% straight-run gasoline, 10.5% of an ammonium petroleum sulfonate (containing about 80% active sulfonate), 1.8% isoproponal and 25% of distilled water containing 9,000 p.p.m. of NaCl. Thereafter, there is injected into the cores 1.2 pore volumes of a mobility buffer (thickened water) composed of 500 p.p.m. of No. 530 Pusher (a high molecular weight partially hydrolyzed polyacrylamide sold by Dow Chemical Company), 500 p.p.m. of NaCl and 50 p.p.m. of NH$_4$SCN dissolved in distilled water. Table I contains results of the core tests.

TABLE I

| | Core charactreistics | | | Pre-Slug Composition | Crude oil recovery | |
|---|---|---|---|---|---|---|
| Sample | Effective Porosity (Percent) | Permeability (md.) | Percent Oil Saturation | 18 000 p.p.m. NaCl plus indicated percent of isopropanol | Percent recovery of crude in core | Percent Improvement over Sample A |
| A | 18.4 | 189 | 64.7 | (¹) | 82.3 | 0 |
| B | 19.9 | 307 | 63.8 | 1 | 91.2 | 11 |
| C | 20.5 | 215 | 65.7 | 2 | 93.6 | 14 |

¹ Not treated with pre-slug.

EXAMPLE 2

Fired Berea sandstone cores 4 feet long by 2 inches in diameter having characteristics indicated in Table II are first saturated with water obtained from the Henry lease in Ill. (contains about 18,000 p.p.m. of total dissolved solids, hereinafter identified as Henry water), flooded to irreducible water saturation with crude oil obtained from the Henry lease in Ill. (a sweet, black crude oil having about 7 cp. viscosity at 72° F. and a specific gravity of 0.843, hereinafter identified as Henry crude oil) and are then flooded with Henry water to residual oil saturation. Core samples are then flooded with 5% formation pore volumes of pre-slugs having compositions indicated in Table II. Thereafter, Samples A, B, and C are injected with a water-external micellar dispersion (percent pore volume indicated in Table II), the dispersion composed of 27.42% Henry crude oil, 6.67% of an ammonium petroleum sulfonate (having an average molecular weight of about 450 and composed of about 80% active sulfonate), 0.74% of isopropanol, 0.56% of nonyl phenol, 64.61% of water treated from the Palestine water reservoir in Palestine, Ill. (containing about 400 p.p.m. of total dissolved solids, hereinafter identified as Palestine water) and 0.979 weight percent of sodium hydroxide. Sample D is flooded with a micellar dispersion composed of 26.85% Henry crude oil, 6.47% of ammonium petroleum sulfonate, 3.21% of isopropanol, 0.81% of nonyl phenol, 62.66% of Palestine water containing 0.979 weight percent of sodium hydroxide. Thereafter, the cores are injected with 1.2 pore volumes of a thickened water slug composed of 800 p.p.m. of No. 530 Pusher, 50 p.p.m. of NH$_4$SCN, 4% of isopropanol, and 96% of Palestine water. Results of the core flooding tests are indicated in Table II:

TABLE II

| | Core Characteristics | | | | Water-external Micellar Solutions (percent pore volume) | Percent Recovery of Crude Oil in Core |
|---|---|---|---|---|---|---|
| Sample | Effective Porosity (percent) | Permeability (md.) | Residual Oil Saturation (percent) | Pre-Slug Composition | | |
| A | 18.4 | 98 | 37.3 | Palestine water +1% NaOH. | 3 | 86.3 |
| B | 18.5 | 97 | 38.7 | Palestine water | 3 | 78.1 |
| C | 18.9 | 176 | 37.0 | Palestine water +4% isopropanol. | 3 | 72.4 |
| D | 19.5 | 180 | 37.6 | 70% Henry water +30% Palestine water. | 5 | 86.4 |

What is claimed is:

1. A process for the recovery of crude oil from subterranean formations wherein a displacing fluid comprised of hydrocarbon and containing electrolyte, and/or semi-polar compound, is injected into and moved through the formation to displace crude oil to a production means in fluid communication with the formation and recovering crude oil through said production means, the process comprising injecting before the displacing fluid a liquid pre-slug containing semi-polar compound or electrolyte and semi-polar compound.

2. The process of claim 1 wherein the pre-slug is aqueous.

3. The process of claim 1 wherein the component(s) within the back portion of pre-slug is in equilibrium with similar component(s) within the front portion of the displacing fluid.

4. The process of claim 1 wherein the displacing fluid is a micellar dispersion.

5. A process for the recovery of crude oil from subterranean formations wherein a displacing fluid is injected into the formation through at least one injection means to displace the crude oil toward at least one production means, the successive injections into the formation comprising:
 (1) an aqueous pre-slug comprised of hydrocarbon and containing component(s) selected from the group consisting of semi-polar compound, and combination of electrolyte and semi-polar compound,
 (2) a displacing fluid comprised of component(s) selected from the group consisting of electrolyte, semi-polar compound, and combination of electrolyte and semi-polar compound,
 (3) a mobility buffer, and
 (4) a drive material in amounts sufficient to displace the displacing fluid toward at least one production means and recovering crude oil therefrom.

6. The process of claim 5 wherein the component(s) within the back portion of the aqueous pre-slug is substantially in equilibrium with the component(s) in the front portion of the displacing fluid.

7. The process of claim 5 wherein the displacing fluid is a micellar dispersion.

8. The process of claim 5 wherein the mobility buffer has a mobility equal to about that or less than that of the displacing fluid.

9. A process for the recovery of crude oil from subterranean formations wherein a micellar dispersion is injected into the formation through at least one injection means to displace the crude oil toward at least one production means, the successive injections comprising:
 (1) an aqueous pre-slug comprised of component(s) selected from the group consisting of semi-polar organic compound and semi-polar organic compound and electrolyte,
 (2) a micellar dispersion comprising hydrocarbon, water, surfactant, semi-polar compound, and electrolyte,
 (3) a mobility buffer, and
 (4) sufficient water drive to displace the micellar dispersion and mobility buffer toward the production means and recovering crude oil therefrom.

10. The process of claim 9 wherein the pre-slug consists essentially of semi-polar organic compound and electrolyte.

11. The process of claim 9 wherein the electrolyte and semi-polar compound within the back portion of the aqueous pre-slug are substantially at equilibrium with the electrolyte and semi-polar compound in the front portion of the micellar dispersion.

12. The process of claim 9 wherein the mobility buffer has a mobility equal to about that or less than that of the micellar dispersion.

13. The process of claim 9 wherein a portion of the mobility buffer is characterized as having graded mobilities increasing from a low of about that of the micellar dispersion to a high of about that of the water drive.

References Cited
UNITED STATES PATENTS

| | | | |
|---|---|---|---|
| 3,123,135 | 3/1964 | Bernard et al. | 166—9 |
| 3,175,610 | 3/1965 | Osoba | 166—9 |
| 3,203,480 | 8/1965 | Froning | 166—9 X |
| 3,261,399 | 7/1966 | Coppel | 166—9 |
| 3,266,570 | 8/1966 | Gogarty | 166—9 |
| 3,270,811 | 9/1966 | Meyer et al. | 166—9 |
| 3,297,084 | 1/1967 | Gogarty et al. | 166—9 |
| 3,298,436 | 1/1967 | McCardell | 166—9 |
| 3,330,344 | 7/1967 | Reisberg | 166—9 |
| 3,343,597 | 9/1967 | Gogarty et al. | 166—9 |
| 3,346,047 | 10/1967 | Townsend et al. | 166—9 |
| 3,348,611 | 10/1967 | Reisberg | 166—9 |
| 3,358,757 | 12/1967 | Holmes | 166—9 |
| 3,369,602 | 2/1968 | Fallgatter et al. | 166—9 |
| 3,373,809 | 3/1968 | Cooke | 166—9 |
| 3,406,754 | 10/1968 | Gogarty | 166—9 |

STEPHEN J. NOVOSAD, Primary Examiner

U.S. Cl. X.R.

166—274

PO-1050
(5/69)

UNITED STATES PATENT OFFICE
CERTIFICATE OF CORRECTION

Patent No. 3,520,366      Dated July 14, 1970

Inventor(s) Stanley C. Jones

It is certified that error appears in the above-identified patent and that said Letters Patent are hereby corrected as shown below:

| | |
|---|---|
| Column 1, line 48: | Delete "interstital" and insert --interstitial--. |
| Column 2, line 26: | Delete "isopropoanol" and insert --isopropanol--. |
| Column 2, line 40: | Delete "substerranean" and insert --subterranean--. |
| Column 2, line 71: | Delete "substerraneon" and insert --subterranean--. |
| Column 3, line 44: | Delete "inveintion" and insert --invention--. |
| Column 4, line 4: | Delete "isoproponal" and insert --isopropanol--. |
| Table II, Sample B, under "Residual Oil Saturation, percent" | Delete "38.7" and insert --37.8--. |

SIGNED AND SEALED
OCT 20 1970

(SEAL)
Attest:

Edward M. Fletcher, Jr.
Attesting Officer

WILLIAM E. SCHUYLER, JR.
Commissioner of Patents